US011854441B2

(12) United States Patent
Kohata et al.

(10) Patent No.: US 11,854,441 B2
(45) Date of Patent: Dec. 26, 2023

(54) COMPUTER-READABLE RECORDING MEDIUM STORING DISPLAY CONTROL PROGRAM, DISPLAY CONTROL METHOD, AND DISPLAY CONTROL APPARATUS

(71) Applicant: FUJITSU LIMITED, Kawasaki (JP)

(72) Inventors: Shun Kohata, Setagaya (JP); Hiroyuki Higuchi, Hino (JP)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 17/577,635

(22) Filed: Jan. 18, 2022

(65) Prior Publication Data
US 2022/0284837 A1    Sep. 8, 2022

(30) Foreign Application Priority Data

Mar. 3, 2021    (JP) .................................. 2021-033554

(51) Int. Cl.
G09F 27/00    (2006.01)
G06Q 50/26    (2012.01)
G06V 20/52    (2022.01)
G06T 7/70     (2017.01)
G06V 40/10    (2022.01)

(52) U.S. Cl.
CPC ......... *G09F 27/004* (2013.01); *G06Q 50/265* (2013.01); *G06T 7/70* (2017.01); *G06V 20/53* (2022.01); *G06V 40/10* (2022.01); *G06T 2207/30196* (2013.01); *G06T 2207/30242* (2013.01)

(58) Field of Classification Search
None
See application file for complete search history.

(56) References Cited

U.S. PATENT DOCUMENTS

| 11,768,978 | B1 * | 9/2023 | Gray ...................... G06F 30/20 703/6 |
| 2011/0221937 | A1 * | 9/2011 | Park .......................... G06T 5/20 348/E9.037 |
| 2011/0234611 | A1 * | 9/2011 | Singhal .................. G09G 5/391 345/582 |
| 2011/0279703 | A1 * | 11/2011 | Lee ........................ H04N 23/88 348/E9.051 |

(Continued)

FOREIGN PATENT DOCUMENTS

| JP | H10-334146 A | 12/1998 |
| JP | 2016-206995 A | 12/2016 |
| JP | 2020-24530 A | 2/2020 |

*Primary Examiner* — Fekadeselassie Girma
(74) *Attorney, Agent, or Firm* — Fujitsu Patent Center

(57) ABSTRACT

A non-transitory computer-readable recording medium storing a display control program for causing a computer to execute processing, the processing including: determining priorities of a plurality of facilities positioned within a specific area according to a value related to congestion determined on the basis of the upper limit number of people in each of the plurality of facilities and the number of visitors calculated on the basis of an image captured in each of the plurality of facilities; selecting a specific number of facilities from the plurality of facilities on the basis of the determined priorities; and displaying, for each of the specific number of selected facilities, a position on a map and alert information according to the value related to the congestion.

8 Claims, 16 Drawing Sheets

(56) References Cited

U.S. PATENT DOCUMENTS

| | | | |
|---|---|---|---|
| 2012/0050575 A1* | 3/2012 | Choe | H04N 23/63 |
| | | | 348/E5.031 |
| 2012/0217764 A1* | 8/2012 | Ishiguro | B60R 1/00 |
| | | | 296/1.07 |
| 2013/0033567 A1* | 2/2013 | Jeong | H04N 23/698 |
| | | | 348/E7.001 |
| 2013/0088463 A1* | 4/2013 | Kim | G06V 10/145 |
| | | | 345/179 |
| 2013/0176474 A1* | 7/2013 | Kim | H04N 23/611 |
| | | | 348/333.11 |
| 2013/0335618 A1* | 12/2013 | Sugawara | G06F 3/04847 |
| | | | 348/349 |
| 2018/0349732 A1* | 12/2018 | Park | G06F 18/2411 |
| 2019/0173741 A1* | 6/2019 | Hieb | H04L 12/10 |
| 2020/0394391 A1* | 12/2020 | Zhang | G06V 40/171 |
| 2021/0342750 A1* | 11/2021 | Hiramoto | G06F 21/32 |
| 2021/0409791 A1* | 12/2021 | Larrew | H04N 21/4223 |
| 2021/0409817 A1* | 12/2021 | Larrew | G06V 20/52 |
| 2021/0409834 A1* | 12/2021 | Larrew | H04N 21/222 |
| 2023/0017751 A1* | 1/2023 | China | G06F 3/012 |

* cited by examiner

FIG. 12
15B1
| SHELTER | THE NUMBER OF EVACUEES | SEATING CAPACITY | THE NUMBER OF VACANCIES | DEGREE OF CONGESTION |
|---|---|---|---|---|
| 2A | 800 | 1000 | 200 | 0.8 |
| 2B | 50 | 500 | 450 | 0.1 |
| 2C | 450 | 900 | 450 | 0.5 |
| 2D | 50 | 800 | 750 | 0.06 |
| 2E | 160 | 200 | 40 | 0.8 |
| 2F | 300 | 500 | 200 | 0.6 |
| 2G | 400 | 800 | 400 | 0.5 |
15C11
| ORDER | SHELTER | DEGREE OF CONGESTION | THE NUMBER OF VACANCIES |
|---|---|---|---|
| 1 | 2A | 0.8 | 200 |
| 1 | 2E | 0.8 | 40 |
| 3 | 2F | 0.6 | 200 |
| 4 | 2C | 0.5 | 450 |
| 4 | 2G | 0.5 | 400 |
| 6 | 2B | 0.1 | 450 |
| 7 | 2D | 0.06 | 750 |
15C12
| ORDER | SHELTER | DEGREE OF CONGESTION | THE NUMBER OF VACANCIES |
|---|---|---|---|
| 1 | 2E | 0.8 | 40 |
| 2 | 2A | 0.8 | 200 |
| 3 | 2F | 0.6 | 200 |
| 4 | 2G | 0.5 | 400 |
| 5 | 2C | 0.5 | 450 |
| 6 | 2B | 0.1 | 450 |
| 7 | 2D | 0.06 | 750 |

| SHELTER | THE NUMBER OF EVACUEES | SEATING CAPACITY | THE NUMBER OF VACANCIES | DEGREE OF CONGESTION | AMOUNT OF CHANGE IN THE NUMBER OF EVACUEES | AMOUNT OF CHANGE IN DEGREE OF CONGESTION |
|---|---|---|---|---|---|---|
| 2A | 800 | 1000 | 200 | 0.8 | 100 | 0.1 |
| 2B | 50 | 500 | 450 | 0.1 | 50 | 0.1 |
| 2C | 450 | 900 | 450 | 0.5 | 20 | 0.02 |
| 2D | 50 | 800 | 750 | 0.06 | 5 | 0.01 |
| 2E | 160 | 200 | 40 | 0.8 | 60 | 0.3 |
| 2F | 300 | 500 | 200 | 0.6 | 30 | 0.06 |
| 2G | 400 | 800 | 400 | 0.5 | 50 | 0.06 |

15C21

| ORDER | SHELTER | AMOUNT OF CHANGE IN DEGREE OF CONGESTION | AMOUNT OF CHANGE IN THE NUMBER OF EVACUEES |
|---|---|---|---|
| 1 | 2E | 0.3 | 60 |
| 2 | 2A | 0.1 | 100 |
| 2 | 2B | 0.1 | 50 |
| 4 | 2F | 0.06 | 30 |
| 4 | 2G | 0.06 | 50 |
| 6 | 2C | 0.02 | 20 |
| 7 | 2D | 0.01 | 5 |

15C22

| ORDER | SHELTER | AMOUNT OF CHANGE IN DEGREE OF CONGESTION | AMOUNT OF CHANGE IN THE NUMBER OF EVACUEES |
|---|---|---|---|
| 1 | 2E | 0.3 | 60 |
| 2 | 2A | 0.1 | 100 |
| 3 | 2B | 0.1 | 50 |
| 4 | 2G | 0.06 | 50 |
| 5 | 2F | 0.06 | 30 |
| 6 | 2C | 0.02 | 20 |
| 7 | 2D | 0.01 | 5 |

| ORDER | SHELTER | DEGREE OF CONGESTION | THE NUMBER OF VACANCIES |
|---|---|---|---|
| 1 | 2E | 0.8 | 40 |
| 2 | 2A | 0.8 | 200 |
| 3 | 2F | 0.6 | 200 |
| 4 | 2G | 0.5 | 400 |
| 5 | 2C | 0.5 | 450 |
| 6 | 2B | 0.1 | 450 |
| 7 | 2D | 0.06 | 750 |

| ORDER | SHELTER | NEAREST SHELTER |
|---|---|---|
| 1 | 2E | 2B |
| 2 | 2A | - |
| 3 | 2F | 2G,2C |
| 4 | 2G | - |
| 5 | 2C | - |
| 6 | 2B | - |
| 7 | 2D | - |

COMPUTER-READABLE RECORDING MEDIUM STORING DISPLAY CONTROL PROGRAM, DISPLAY CONTROL METHOD, AND DISPLAY CONTROL APPARATUS

CROSS-REFERENCE TO RELATED APPLICATION

This application is based upon and claims the benefit of priority of the prior Japanese Patent Application No. 2021-33554, filed on Mar. 3, 2021, the entire contents of which are incorporated herein by reference.

FIELD

The embodiments discussed herein are related to a display control technology.

BACKGROUND

Disaster evacuee support services are provided for crisis managers in local governments. In the disaster evacuee support service, from an aspect of implementing efficient shelter management by crisis managers such as local government staffs, a dashboard function is provided that aggregates and displays various types of information regarding shelters managed in an area under jurisdiction of a local government or the like. For example, in the dashboard function, shelters under the jurisdiction of the local government or the like are mapped and displayed on a map, and further, the number of people who evacuate to a shelter is counted and displayed for each shelter.

Examples of the related art include as follows: Japanese Laid-open Patent Publication No. 10-334146; Japanese Laid-open Patent Publication No. 2020-24530; and Japanese Laid-open Patent Publication No. 2016-206995.

SUMMARY

According to an aspect of the embodiments, there is provided a non-transitory computer-readable recording medium storing a display control program for causing a computer to execute processing. In an example, the processing includes: determining priorities of a plurality of facilities positioned within a specific area according to a value related to congestion determined on the basis of the upper limit number of people in each of the plurality of facilities and the number of visitors calculated on the basis of an image captured in each of the plurality of facilities; selecting a specific number of facilities from the plurality of facilities on the basis of the determined priorities; and displaying, for each of the specific number of selected facilities, a position on a map and alert information according to the value related to the congestion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a schematic diagram illustrating an example of selection algorithm;

FIG. 14 is a schematic diagram illustrating an application example of the selection algorithm;

DESCRIPTION OF EMBODIMENTS

However, in the dashboard function described above, information regarding all the shelters managed in the area under the jurisdiction of the local government or the like is aggregated and displayed on one screen. Thus, the greater the number of shelters managed by the local government or the like, the more pieces of information are displayed on a dashboard screen. As a result, in the dashboard function described above, information regarding a shelter for which countermeasures are needed may be buried in information regarding other shelters. Note that, although the dashboard function related to shelters is given as an example here, a similar problem may occur also in a dashboard function related to facilities in general.

In one aspect, an embodiment aims to provide a display control program, a display control method, and a display control apparatus that are capable of suppressing information overload.

Hereinafter, a display control program, a display control method, and a display control apparatus according to the present application will be described with reference to the accompanying drawings. Note that the embodiments do not limit the technology disclosed. In addition, each of the embodiments may be suitably combined within a range without causing contradiction between processing contents.

First Embodiment

Figure 1:
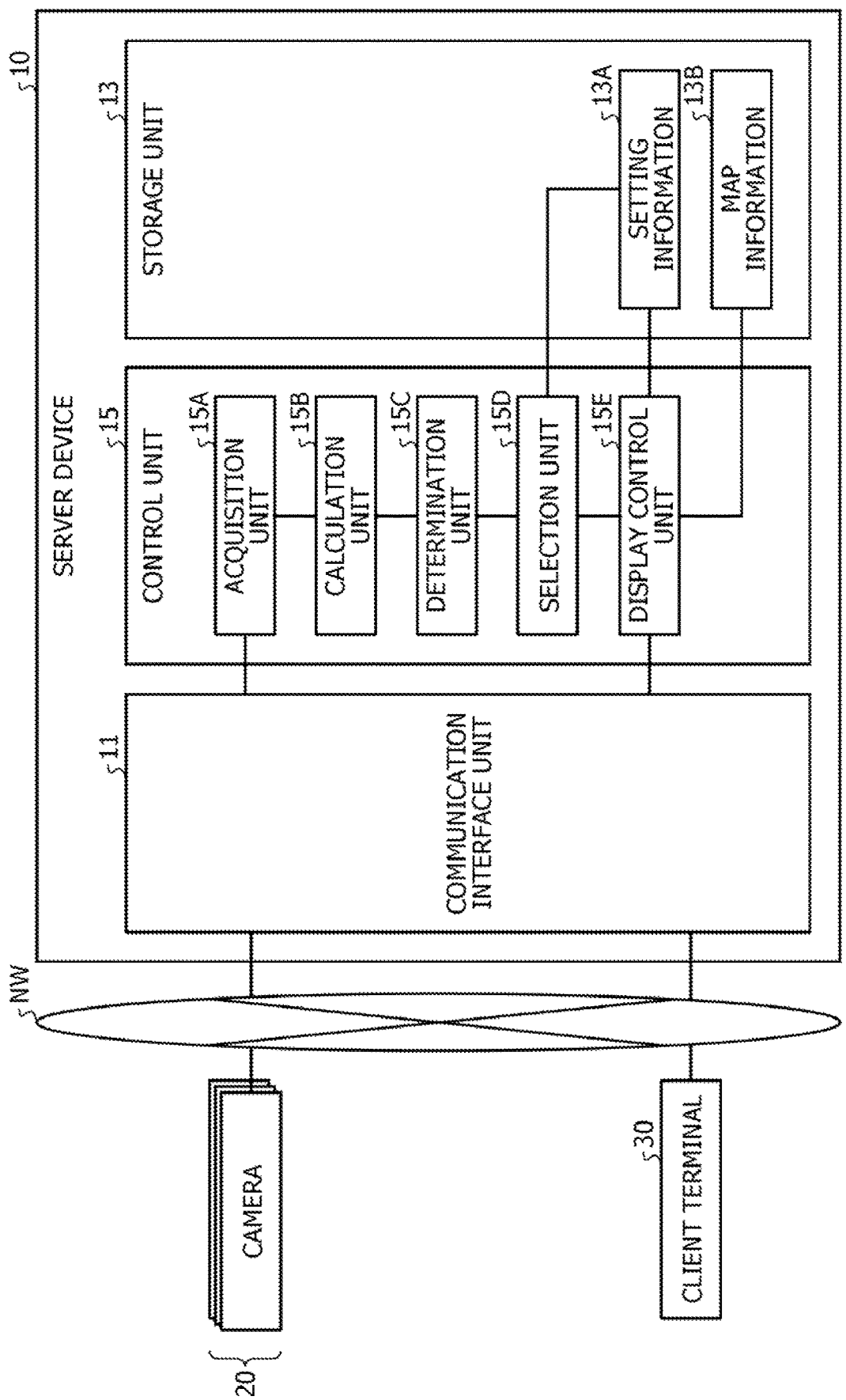
FIG. 1 is a block diagram illustrating a functional configuration example of a server device according to a first embodiment.

FIG. 1 is a block diagram illustrating a functional configuration example of a server device 10 according to a first embodiment. The server device 10 illustrated in FIG. 1 is an example of a computer that provides a disaster evacuee support service for a crisis manager of a local government or the like.

For example, the server device 10 may be implemented by causing an optional computer to execute a disaster evacuee support program that implements a function corresponding to the disaster evacuee support service described above. As an example, the server device 10 may be implemented as a server that provides the function corresponding to the disaster evacuee support services described above on premise. As another example, the server device 10 may also be implemented as a software as a service (SaaS) type application to provide the disaster evacuee support service described above as a cloud service.

Furthermore, as illustrated in FIG. 1, the server device 10 may be communicably connected to cameras 20 and a client terminal 30 via a network NW. For example, the network NW may be an optional type of communication network such as the Internet or a local area network (LAN) regardless of whether the network NW is wired or wireless.

The camera 20 is an example of an imaging device equipped with an imaging element such as a charge coupled device (CCD) or a complementary metal oxide semiconductor (CMOS). As an example only, the camera 20 may be installed in each shelter managed in an administrative division under jurisdiction of a local government or the like.

The client terminal 30 is an example of a computer provided with the disaster evacuee support service described above. As an example only, the client terminal 30 may be used at a disaster countermeasure headquarter, a shelter reception, and the like, with a crisis manager such as a local government staff or a related person as a user. For example, a desktop computer such as a personal computer, or the like may correspond to the client terminal 30. This is merely an example, and the client terminal 30 may be an optional computer such as a laptop computer, a mobile terminal device, or a wearable terminal.

Note that, although FIG. 1 illustrates an example in which the disaster evacuee support service described above is provided by a client-server system, the present embodiment is not limited to this example, and the disaster evacuee support service described above may be provided in a standalone manner.

Here, from an aspect of implementing efficiency of shelter management by a crisis manager, the disaster evacuee support service described above may be packaged with a dashboard function that visualizes a situation of evacuees in a shelter managed in an area under jurisdiction of a local government or the like.

For example, the visualization of the situation of the evacuees contributes to the efficiency of the shelter management from the following viewpoints. As one aspect, when there is a natural disaster such as an earthquake or typhoon, the visualization of the situation of the evacuees may contribute from viewpoints of grasping a situation of a shelter, grasping concentration of evacuation, real-time summation, securing a staff mobilization system, and the like. As another aspect, under a COVID-19 pandemic, the visualization of the situation of the evacuees may contribute from viewpoints of avoiding three Cs, which are closed spaces, crowded places, and close-contact settings, a social distance, a change in shelter capacity, and further, dispersion of evacuees, and the like. For example, under a disaster caused by an epidemic of an infectious disease under the COVID-19 pandemic or the like, or a complex disaster including an epidemic of an infectious disease, grasping the number of people in each shelter, grasping bias of the number of people among shelters, and the like are useful for countermeasures against an infection risk.

From such an aspect, the dashboard function described above displays, as a dashboard screen, a window in which various types of information regarding shelters managed in an area under jurisdiction of a local government or the like, for example, the number of people in a shelter, are aggregated.

Figure 2:
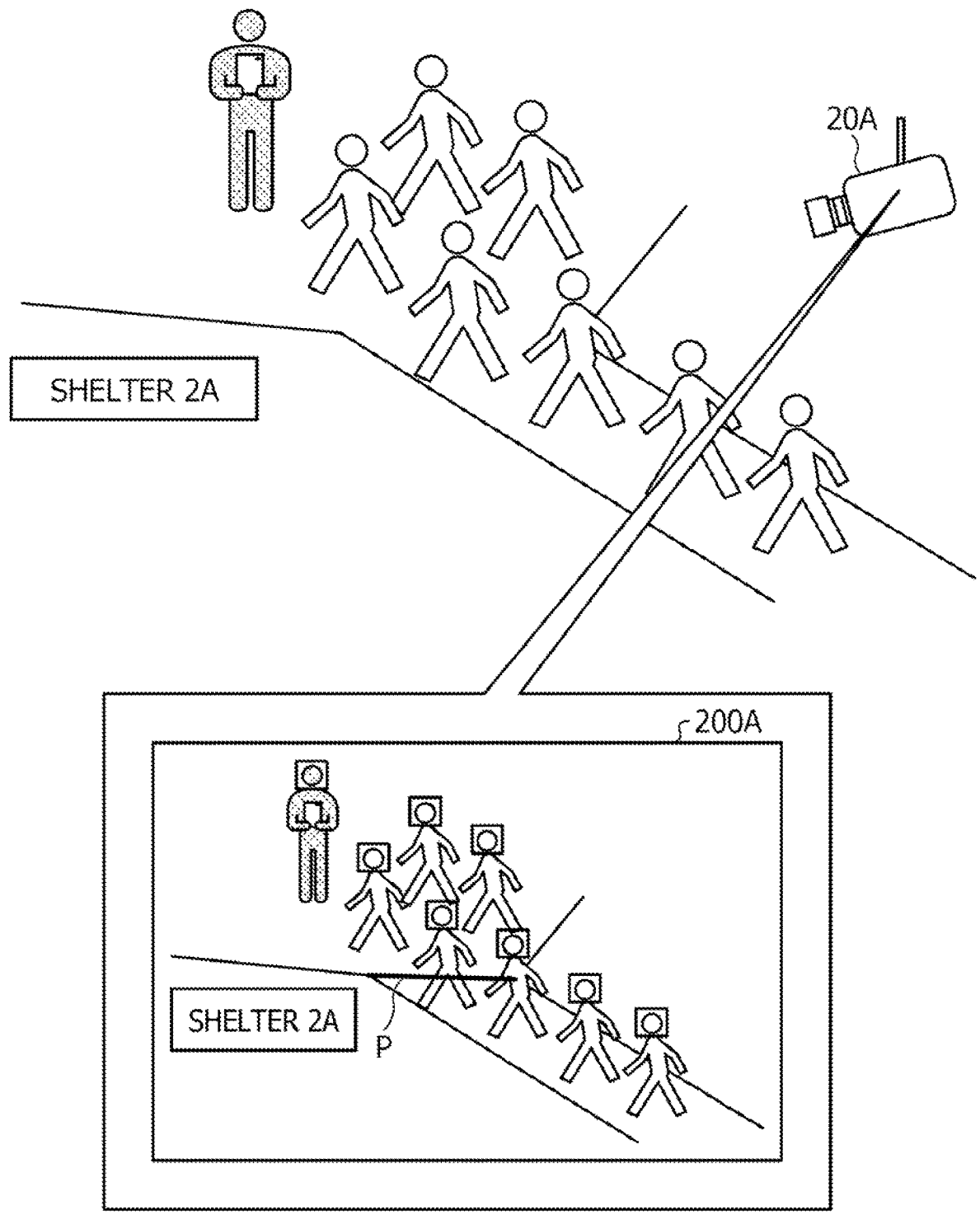
FIG. 2 is a diagram schematically illustrating image analysis used for a dashboard function.

FIG. 2 is a diagram schematically illustrating image analysis used for the dashboard function. FIG. 2 illustrates, as an example only, an example in which the number of people in a shelter 2A is counted by an image analysis technology. In the example illustrated in FIG. 2, a camera 20A is installed near an entrance of the shelter 2A. Under such camera arrangement, human heads, for example, portions of bounding boxes illustrated in FIG. 2 are detected from an image 200A captured by the camera 20A. By tracking the heads detected in this way, the number of people passing a line L1 set on the image captured by the camera 20A is counted. For example, in a case where a head passes the line L1 from the outside to the inside of the shelter 2A, the number of people in the shelter 2A is incremented. On the other hand, in a case where a head passes the line L1 from the inside to the outside of the shelter 2A, the number of people in the shelter 2A is decremented. In this way, events of visiting the shelter 2A and of leaving the shelter 2A are detected on the basis of the image captured by the camera 20A, and the number of people visiting the shelter 2A is updated according to the events of visiting or leaving. Hereinafter, a visitor who is visiting the shelter 2A may be described as "evacuee" and the number of evacuees may be described as "the number of evacuees".

Note that, although FIG. 2 illustrates an example in which the number of evacuees in the shelter 2A is counted by detecting the head, the number of evacuees may be counted by detecting the face or the whole body. Furthermore, although FIG. 2 illustrates an example in which the number of people in the facility, for example, the shelter is counted by counting the number of people passing the line L1, the number of evacuees in the shelter itself may be counted.

Furthermore, although FIG. 2 illustrates, as an example only, an example in which the number of evacuees in the shelter 2A is counted by the image analysis, the number of evacuees may be counted by another technology. For example, the number of people passing the entrance of the shelter 2A may be counted by tracking position information of a mobile terminal device used by an evacuee or detecting a beacon of near field communication. Furthermore, the number of people entering and exiting may be collected from a counter input by a local government staff or the like at a shelter reception.

On the basis of the number of evacuees in the shelter obtained in this way, the dashboard function maps shelters under jurisdiction of a local government or the like on a map, and may display, on the dashboard screen, various types of information regarding the number of evacuees for each mapped shelter.

Figure 3:
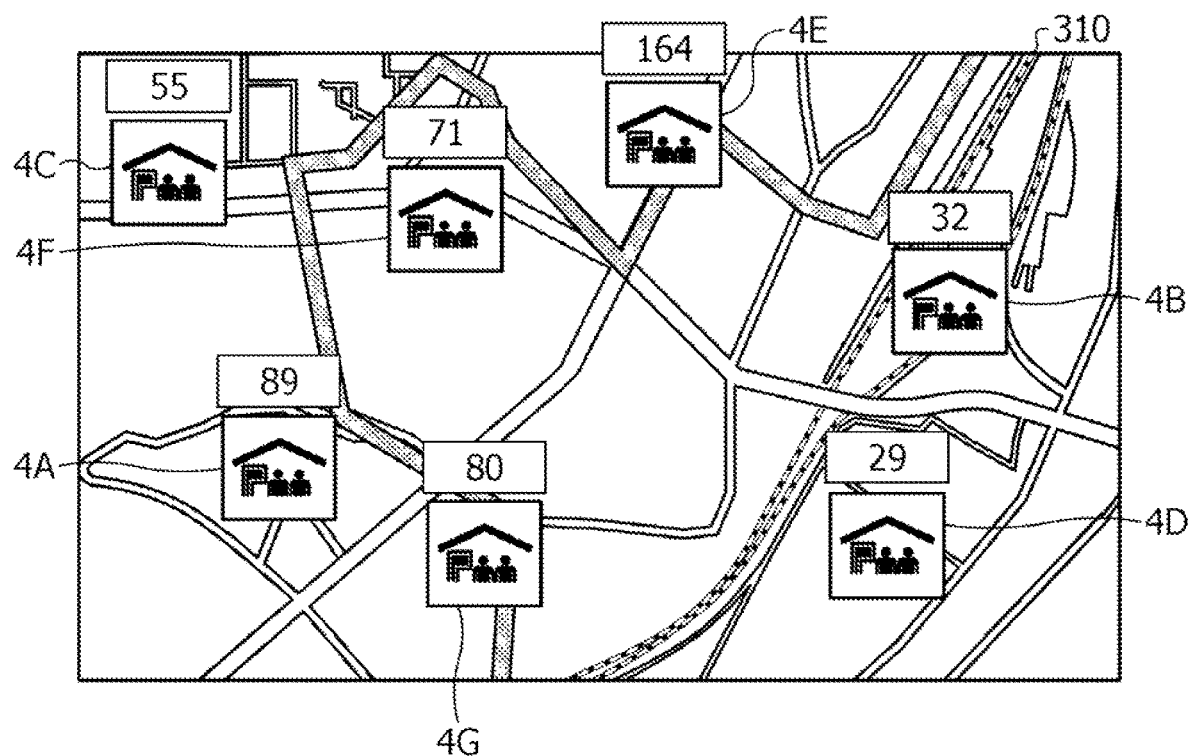
FIG. 3 is a diagram illustrating an example of a dashboard screen.
Figure 4:
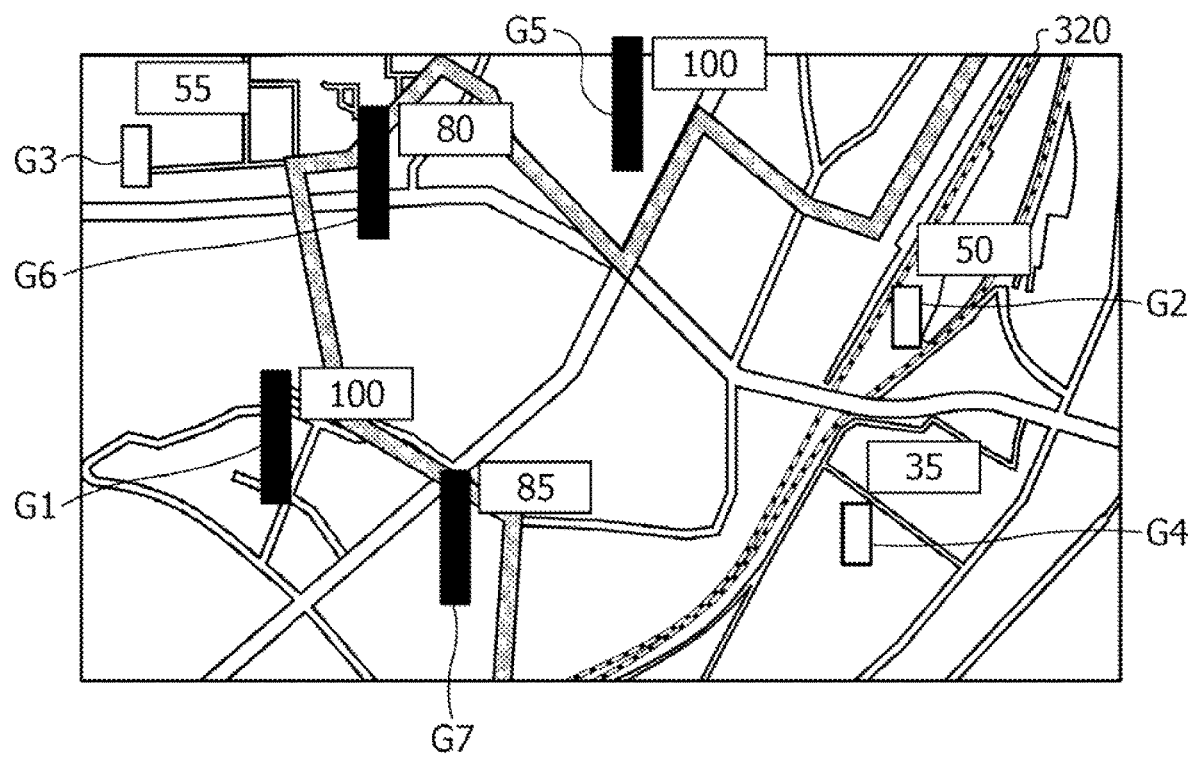
FIG. 4 is a diagram illustrating an example of the dashboard screen.
Figure 5:
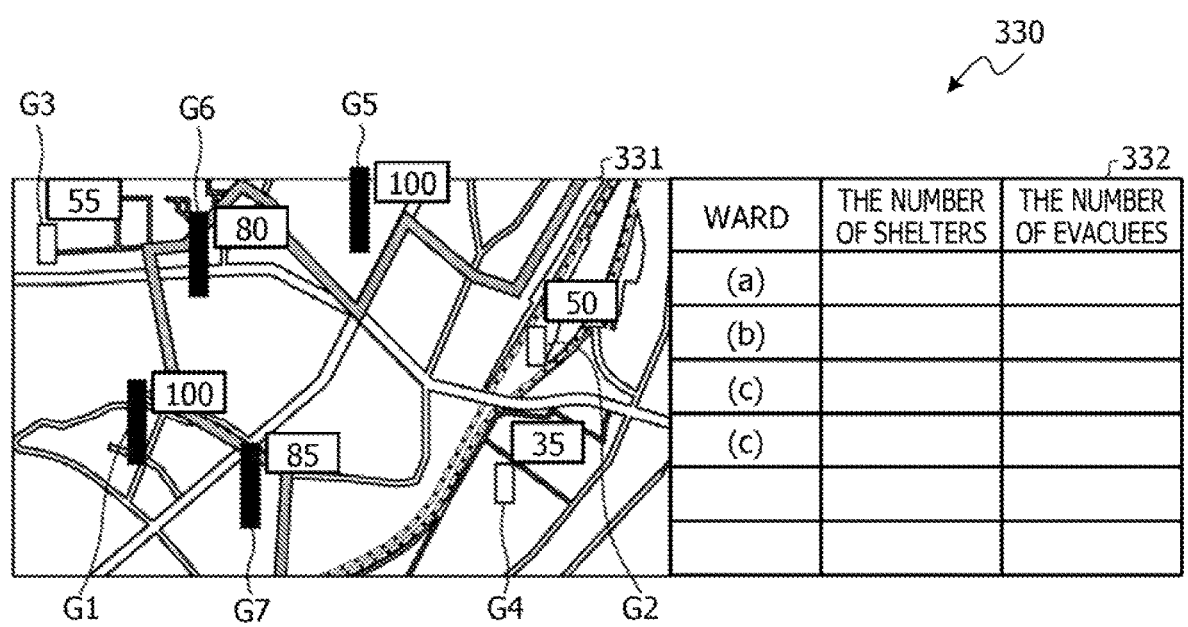
FIG. 5 is a diagram illustrating an example of the dashboard screen.

As an example only, three display patterns on the dashboard screen will be given. FIGS. 3 to 5 are diagrams illustrating examples of the dashboard screen. FIGS. 3 to 5 illustrate dashboard screens 310 to 330 as examples of the dashboard screen. As illustrated in FIGS. 3 to 5, on each of the dashboard screens 310 to 330, a map image is displayed in which a map of an area under jurisdiction of a local government that is a subscriber to the disaster evacuee support service described above, such as "city" and "ward", is drawn, for example.

As illustrated in FIG. 3, on the dashboard screen 310, a map image is displayed in which symbols 4A to 4G respectively corresponding to shelters 2A to 2G managed in the area under the jurisdiction of the local government are mapped to positions corresponding to the shelters 2A to 2G. For such mapping, as an example, a function provided by geographical information system (GIS) software may be used. Moreover, on the dashboard screen 310, an annotation such as the number of evacuees in each of the shelters 2A to 2G is displayed in association with each of the symbols 4A to 4G corresponding to the shelters 2A to 2G.

As illustrated in FIG. 4, on the dashboard screen 320, a map image is displayed in which charts representing the numbers of evacuees in the shelters 2A to 2G, for example, bar graphs G1 to G7, are mapped to the positions corresponding to the position information of the shelters 2A to 2G. Moreover, on the dashboard screen 320, an annotation such as the number of evacuees in each of the shelters 2A to 2G is displayed in association with each of the bar graphs G1 to G7 corresponding to the shelters 2A to 2G. When the bar graphs G1 to G7 are displayed in this way, a display form may be distinguished between a bar graph of a shelter where the number of evacuees is equal to or greater than a threshold and a bar graph of a shelter where the number of evacuees is not equal to or greater than the threshold. For example, in the example of the dashboard screen 320, the bar graphs G1, G5, G6, and G7 corresponding to the shelters 2A, 2E, 2F, and 2G where the number of evacuees is equal to or greater than 80 are displayed with a black background. On the other hand, the bar graphs G2, G3, and G4 corresponding to the shelters 2B, 2C, and 2D where the number of evacuees is less than 80 are displayed with a white background.

As illustrated in FIG. 5, the dashboard screen 330 includes a map image 331 and an evacuation situation table 332. Of these, the map image 331 is a map image similar to that on the dashboard screen 320 illustrated in FIG. 4. On the other hand, the evacuation situation table 332 is a table in which, for each of sections included in the area under the jurisdiction of the local government or the like, for example, "wards" of (a) to (d), items such as the total number of shelters managed in each ward and the total number of evacuees evacuated to the shelters in each ward are associated.

Here, for convenience of description, FIGS. 3 to 5 illustrate examples in which the number of shelters managed by the local government is seven, namely, the shelters 2A to 2G, but a large number of shelters may be managed by one city, town, or village. As an example only, the number of shelters managed by one city, town, or village may exceed 100. In a case where a large number of shelters are managed by one local government in this way, too much information is displayed on the dashboard screen.

Figure 6:
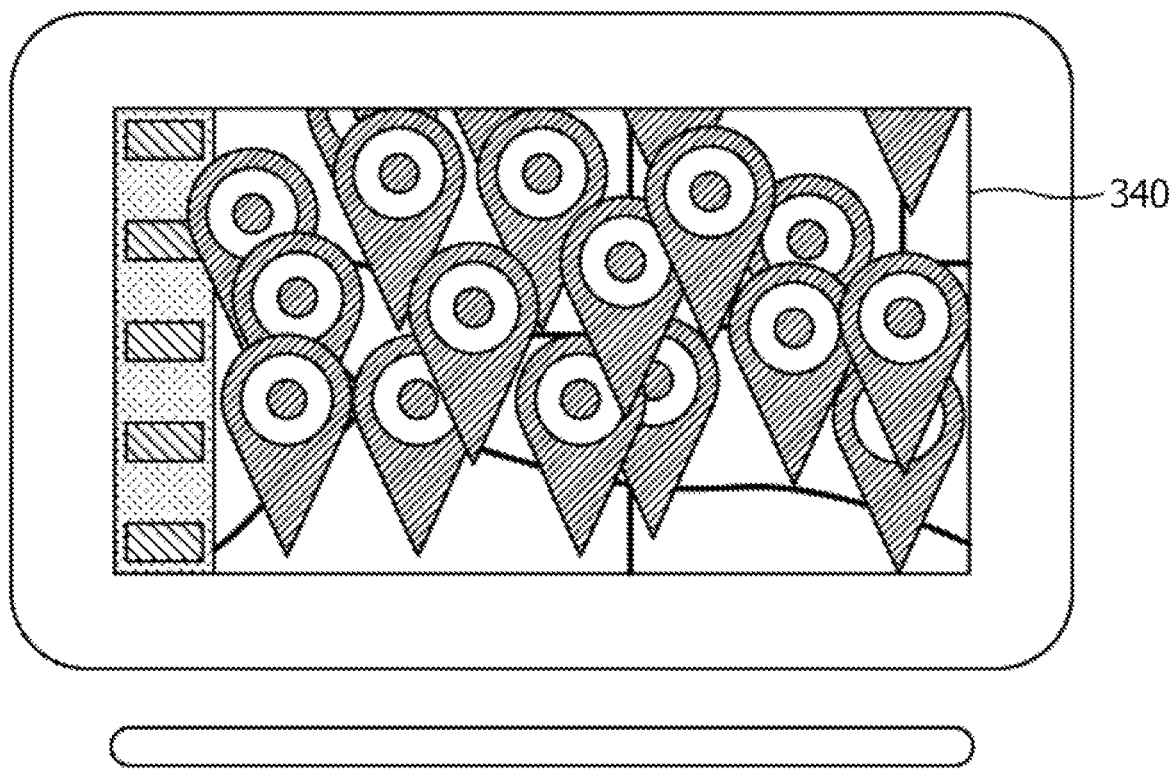
FIG. 6 is a diagram illustrating an example of the dashboard screen.

FIG. 6 is a diagram illustrating an example of the dashboard screen. FIG. 6 illustrates a dashboard screen 340 in which symbols of shelters are plotted at positions of 19 shelters managed by a local government on a map image of an area under jurisdiction of the local government. Here, in FIG. 6, only the symbols are displayed on the dashboard screen 340, but annotations such as the number of evacuees may also be displayed. As illustrated in FIG. 6, in a case where a large number of shelters are managed by one local government, the number of symbols and the number of annotations displayed on the dashboard screen 340 also increase. In this way, too much information is displayed on the dashboard screen 340, so that a situation may occur where the information regarding each shelter is not paid attention to by a crisis manager. As a result, density of information displays increases as the number of symbols and annotations displayed increases, so that a vicious cycle may occur in which information regarding one shelter obstructs visibility of information regarding another shelter.

As a result, there is an aspect that there arises a problem that information regarding a shelter for which countermeasures are needed is buried in information regarding other shelters. As an example only, an information display of a shelter where the number of evacuees is rapidly increasing or congestion is occurring is buried in information displays of shelters where the number of evacuees is not rapidly increasing or congestion is not occurring. This results in an increase in a time lag between the rapid increase in the number of evacuees or the occurrence of congestion at the shelter and recognition by a crisis manager. As such a time lag increases, a response to implementation of infection risk reduction measures such as dispersion of evacuees also decreases.

Even if too much information is displayed on the dashboard screen in this way, a problem-solution approach of decomposing or dividing the information displayed on the dashboard screen is rejected. For example, when a part of the map corresponding to the area under the jurisdiction of the local government is enlarged and displayed, visibility of an information display of a shelter included in the enlarged display portion is improved. However, information regarding a shelter included in a portion other than the enlarged display portion is hidden. In a case where such an enlarged display is allowed, in order to monitor the entire area under the jurisdiction of the local government, it is needed to switch between an operation of enlarging a part of the area and an operation of returning to the display of the entire area. However, in a case where the operation of returning to the display of the entire area is not performed after the enlarged display is performed, monitoring of the shelters is performed in a state where the information regarding the shelter included in the portion other than the enlarged display portion remains hidden. In this case, it becomes difficult to prevent countermeasures for the shelter where the number of evacuees is rapidly increasing or congestion is occurring from being left unattended. From such an aspect, it is appropriate that the dashboard screen has a format in which information regarding all the shelters managed in the area under the jurisdiction of the local government is aggregated and displayed.

Thus, the dashboard function according to the present embodiment displays alert information regarding a shelter selected according to a value related to congestion that is evaluated from the upper limit number of people for each of a plurality of shelters included in a specific area and the number of evacuees calculated from each image of the plurality of shelters. Hereinafter, the value related to congestion evaluated from the upper limit number of people and the number of evacuees in the shelter may be described as "congestion evaluation value".

With such a display control function, by narrowing down, according to the congestion evaluation value, the shelters to be alerted displayed separately from the information displays of the shelters displayed on the dashboard screen, the alert information regarding the shelter where the number of evacuees is rapidly increasing or congestion is occurring is displayed.

Hereinafter, display examples of the alert information will be given with reference to FIGS. 7 to 11. FIGS. 7 to 11 are diagrams illustrating display examples of the alert information. Here, from an aspect of making description with emphasis on comprehensively listing display patterns of the alert information, details of algorithm for selecting a shelter to be alerted according to the congestion evaluation value will be described later together with description of a functional configuration of the server device 10.

Figure 7:
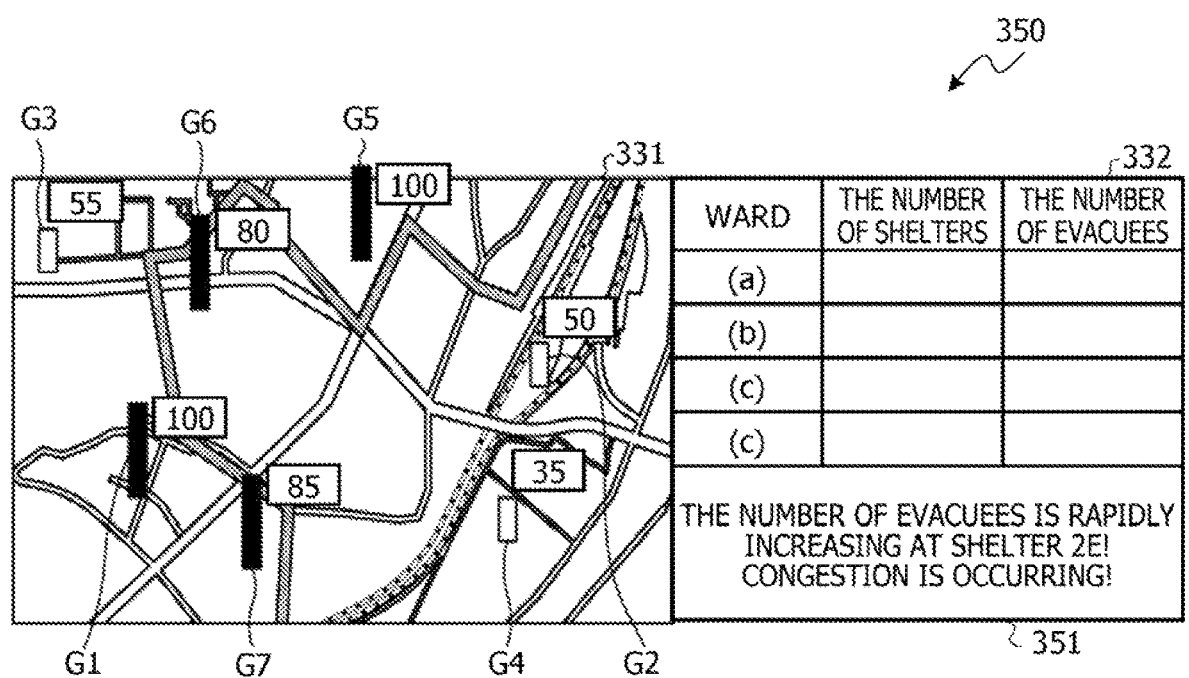
FIG. 7 is a diagram illustrating a display example of alert information.

FIG. 7 illustrates a display example of the alert information in a case where one shelter with the highest congestion evaluation value among the shelters 2A to 2G illustrated in FIGS. 3 to 5, which is the shelter 2E, is selected by the display control function described above. As illustrated in FIG. 7, a dashboard screen 350 includes a log display area 351 in addition to the map image 331 and the evacuation situation table 332 illustrated in FIG. 5.

As one aspect, the log display area 351 is an area where logs of various events including movements such as visiting and leaving of new evacuees are displayed. For example, in the log display area 351, alert information regarding the shelter 2E having the highest congestion evaluation value is displayed by the display control function described above. The alert information regarding the shelter 2E does not necessarily need to be displayed just because the shelter 2E has a higher priority than other shelters in this way, and a specific condition may be set for the display of the alert information regarding the shelter 2E. For example, in a case where the congestion evaluation value of the shelter 2E is equal to or greater than a threshold, a message by texts such as "THE NUMBER OF EVACUEES IS RAPIDLY INCREASING AT SHELTER 2E!" or "CONGESTION IS OCCURRING!" may be displayed as indicated in the log display area 351. Furthermore, it is also possible to output a voice for the text corresponding to the message by using a text reading function or the like. In addition, by displaying the symbol 4E of the shelter 2E to be alerted by blinking or highlighting, it is possible to make a distinction from display forms of the symbols of other shelters.

FIGS. 8 to 11 illustrate display examples of the alert information in a case where a specific number of shelters with a higher congestion evaluation value, which are the shelters 2E, 2A, 2F, and 2G corresponding to the top four shelters, for example, are selected among the shelters 2A to 2G illustrated in FIGS. 3 to 5 by the display control function described above. Note that FIGS. 8 to 11 illustrate examples of displaying the alert information regarding all the four shelters 2E, 2A, 2F, and 2G, but this is just an example. For example, the alert information regarding all the four shelters does not necessarily need to be displayed just because the four shelters have a higher priority than other shelters, and shelters to be alerted may be narrowed down by a specific condition using the congestion evaluation value or the like.

Figure 8:
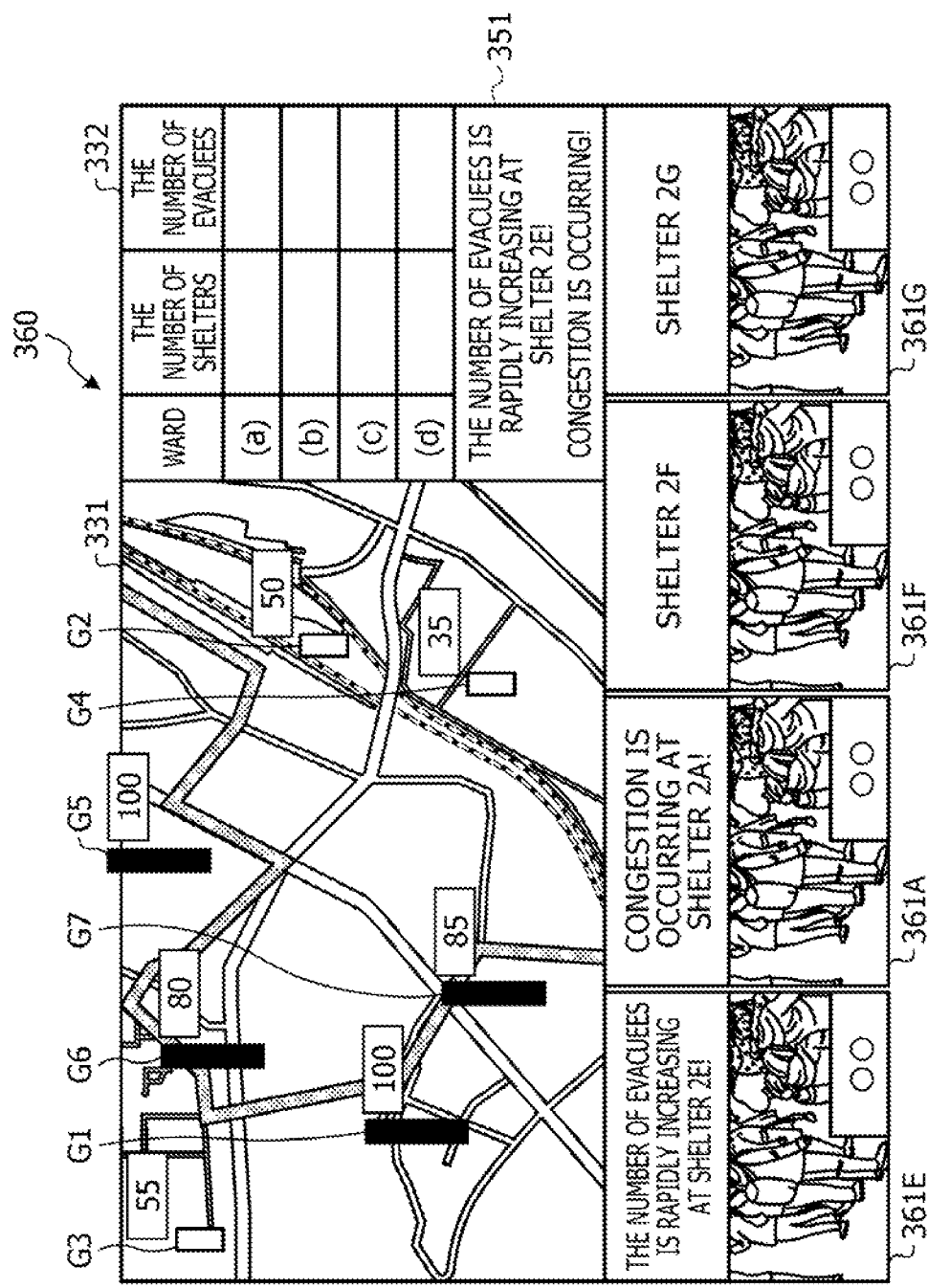
FIG. 8 is a diagram illustrating a display example of the alert information.

For example, a dashboard screen 360 illustrated in FIG. 8 includes a thumbnail 361E, a thumbnail 361A, a thumbnail 361F, and a thumbnail 361G in addition to the map image 331, the evacuation situation table 332, and the log display area 351 illustrated in FIG. 7.

These thumbnails 361E, 361A, 361F, and 361G are images of the shelters 2E, 2A, 2F, and 2G captured by cameras 20E, 20A, 20F and 20G, respectively, or reduced images thereof. In a case where such thumbnail display is performed, as illustrated in FIG. 8, the thumbnails 361E, 361A, 361F, and 361G may be displayed side by side in descending order of the congestion evaluation value, for example, in the order of the shelter 2E, the shelter 2A, the shelter 2F, and the shelter 2G. Moreover, each of the thumbnails 361E, 361A, 361F, and 361G may be associated with shelter identification information or information such as a warning of a rapid increase of evacuees or congestion and the number of evacuees as a label or annotation. For example, in the example of the thumbnail 361E, in association with the image of the shelter 2E captured by the camera 20E, shelter identification information "shelter 2E", a message "THE NUMBER OF EVACUEES IS RAPIDLY INCREASING AT SHELTER 2E!", the number of evacuees "164", and the like are displayed. Note that, by displaying the symbols 4E, 4A, 4F, and 4G corresponding to the shelters 2E, 2A, 2F, and 2G to be alerted by blinking or highlighting, it is possible to make a distinction from the display forms of the symbols of other shelters.

By displaying such thumbnails 361E, 361A, 361F, and 361G, it is possible to have a crisis manager confirm a state at a site of each of the shelters 2E, 2A, 2F, and 2G, for example, whether or not three Cs may be avoided, or the like when the number of evacuees is rapidly increasing or congestion is occurring.

Figure 9:
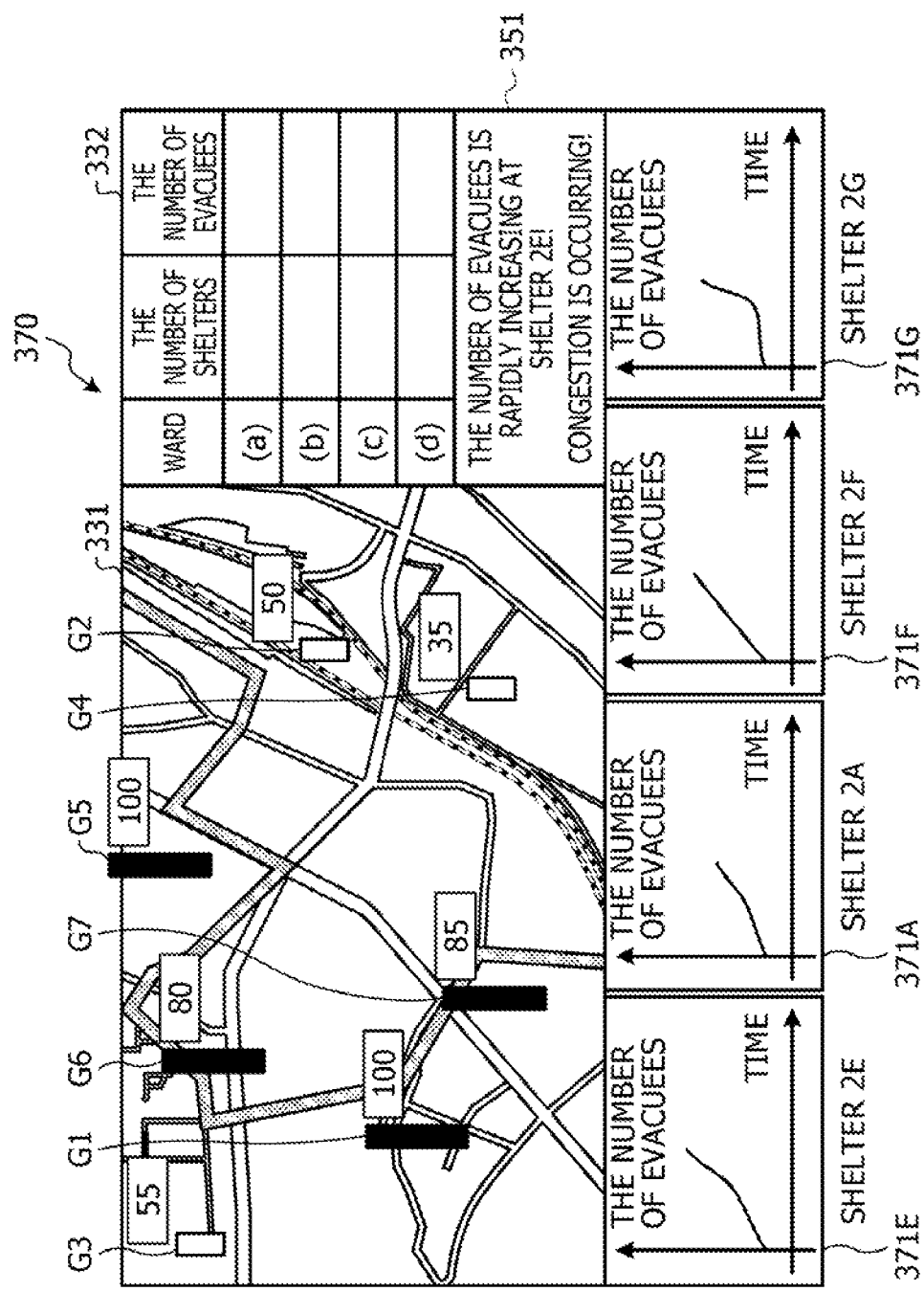
FIG. 9 is a diagram illustrating a display example of the alert information.

Furthermore, a dashboard screen 370 illustrated in FIG. 9 includes a chart 371E, a chart 371A, a chart 371F, and a chart 371G in addition to the map image 331, the evacuation situation table 332, and the log display area 351 illustrated in FIG. 7.

These charts 371E, 371A, 371F, and 371G are graphs that graphically represent a relationship between the number of evacuees at each of the shelters 2E, 2A, 2F, and 2G and time. For example, each of the charts is generated by plotting time-series data of the number of evacuees calculated by using the number of evacuees counting function illustrated in FIG. 2 on a graph with a vertical axis representing the number of evacuees and a horizontal axis representing time. As illustrated in FIG. 9, these charts 371E, 371A, 371F, and 371G may be displayed side by side in descending order of the congestion evaluation value, for example, in the order of the shelter 2E, the shelter 2A, the shelter 2F, and the shelter 2G. Note that, similarly to the example illustrated in FIG. 8, the charts 371E, 371A, 371F, and 371G illustrated in FIG. 9 may also be associated with shelter identification information or information such as a warning of a rapid increase of evacuees or congestion and the number of evacuees as a label or annotation.

By displaying such charts 371E, 371A, 371F, and 371G, it is possible to have a crisis manager confirm congestion at the time when each chart is observed, and further, a transition of the number of evacuees increasing up to that time, or the like.

Figure 10:
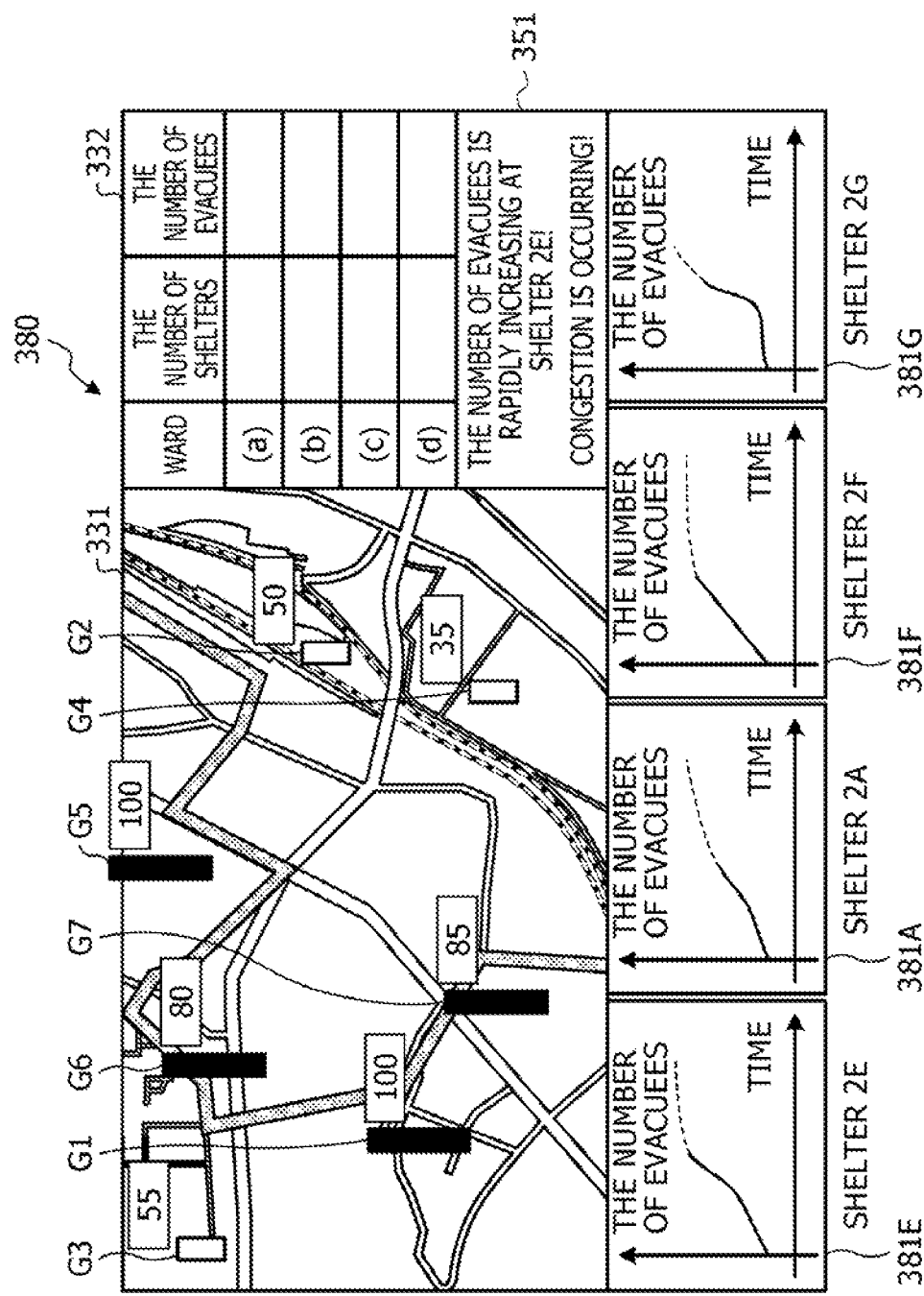
FIG. 10 is a diagram illustrating a display example of the alert information.

Furthermore, a dashboard screen 380 illustrated in FIG. 10 includes a chart 381E, a chart 381A, a chart 381F, and a chart 381G in addition to the map image 331, the evacuation situation table 332, and the log display area 351 illustrated in FIG. 7.

These charts 381E, 381A, 381F, and 381G are common to FIG. 9 in that they are graphs that graphically represent a relationship between the number of evacuees at each of the shelters 2E, 2A, 2F, and 2G and time. On the other hand, these charts 381E, 381A, 381F, and 381G differ from those of FIG. 9 in that, in addition to the time-series data of an actual measurement value of the number of evacuees calculated by using the number of evacuees counting function illustrated in FIG. 2, time-series data of a prediction value of the number of evacuees predicted on the basis of an actual value by simulation or the like is plotted in each chart. For example, in each of the charts 381E, 381A, 381F, and 381G, a transition of the actual measurement value of the number of evacuees is drawn as a waveform illustrated by a solid line in FIG. 10, and in addition, a transition of the prediction value of the number of evacuees is drawn as a waveform illustrated by a broken line in FIG. 10. Similarly to the example illustrated in FIG. 9, these charts 381E, 381A, 381F, and 381G may also be displayed side by side in descending order of the congestion evaluation value, for example, in the order of the shelter 2E, the shelter 2A, the shelter 2F, and the shelter 2G. Note that, similarly to the examples illustrated in FIGS. 8 and 9, the charts 381E, 381A, 381F, and 381G illustrated in FIG. 10 may also be associated with shelter identification information or information such as a warning of a rapid increase of evacuees or congestion and the number of evacuees as a label or annotation.

By displaying such charts 381E, 381A, 381F, and 381G, it is possible to have a crisis manager confirm future prediction of congestion and rapid increase after the time when each chart is observed.

Figure 11:
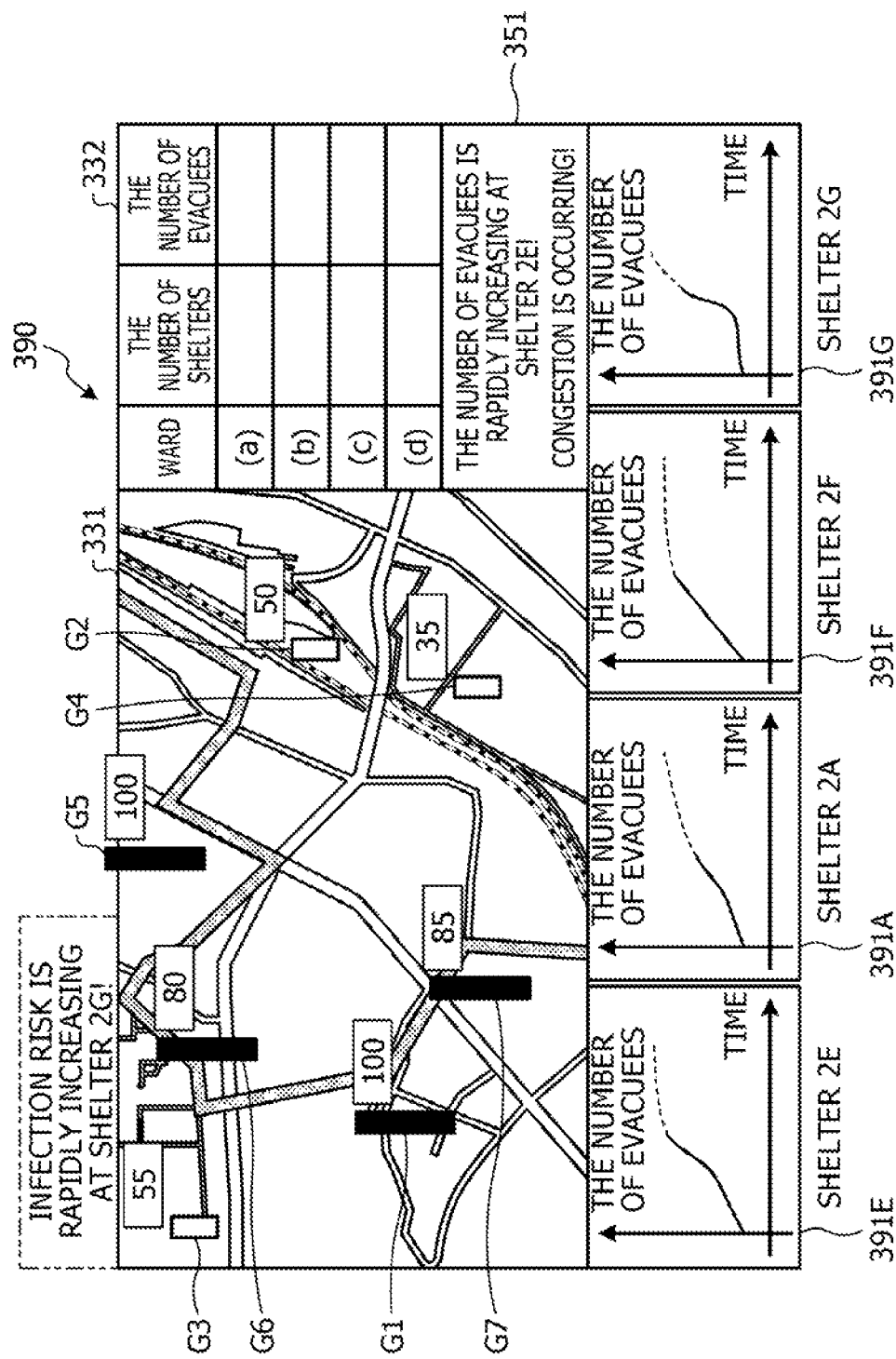
FIG. 11 is a diagram illustrating a display example of the alert information.

Moreover, a dashboard screen 390 illustrated in FIG. 11 includes an indicator 391 in addition to the map image 331, the evacuation situation table 332, the log display area 351, the chart 381E, the chart 381A, the chart 381F, and the chart 381G illustrated in FIG. 10.

The indicators 391 are signs generated on the basis of the time-series data of the prediction value of the number of evacuees predicted by simulation or the like. As an example only, the indicator 391 may be pop-up displayed only in a case where a prediction value of the number of evacuees at any time of the time-series data of the prediction value of the number of evacuees is equal to or greater than a threshold. In this case, not only a display output of the indicator 391 including a message such as a text "INFECTION RISK IS RAPIDLY INCREASING AT SHELTER 2G!" illustrated in FIG. 11, but also a synthetic sound which reads out the message or a beep sound or pop sound may be audio-output.

By displaying such an indicator 391, it is possible to send, to a crisis manager, a push notification of the shelter 2G, which has a high risk of congestion and rapid increase in the future prediction after the time when each chart is observed.

As illustrated in FIGS. 7 to 11, the display control function according to the present embodiment may display alert information regarding a shelter where the number of evacuees is rapidly increasing or congestion is occurring. Therefore, according to the display control function according to the present embodiment, it is possible to suppress information overload. As a result, it is also possible to prevent information regarding a facility for which countermeasures are needed from being buried.

Next, the functional configuration of the server device 10 having the display control function according to the present embodiment will be described. FIG. 1 schematically illustrates blocks corresponding to functions of the server device 10. As illustrated in FIG. 1, the server device 10 includes a communication interface unit 11, a storage unit 13, and a control unit 15. Note that FIG. 1 only illustrates an excerpt of functional units related to the display control function described above. A functional unit other than the illustrated ones, for example, a functional unit that an existing computer is equipped with by default or as an option may be provided in the server device 10.

The communication interface unit 11 corresponds to an example of a communication control unit that controls communication with another device, for example, the camera 20 or the client terminal 30. As an example only, the communication interface unit 11 is implemented by a network interface card such as a LAN card. As one aspect, the communication interface unit 11 accepts upload of an image captured by the camera 20 from the camera 20, and outputs, to the camera 20, various settings, for example, an amount of controlling pan, tilt, and the like of the camera 20 and a target azimuth. As another aspect, the communication interface unit 11 accepts a display request of the dashboard screen from the client terminal 30, and outputs display data of the dashboard screen to the client terminal 30.

The storage unit 13 is a functional unit that stores various types of data. As an example only, the storage unit 13 is implemented by storage, for example, internal, external or auxiliary storage. For example, the storage unit 13 stores setting information 13A and map information 13B. In addition to these setting information 13A and map information 13B, the storage unit 13 may store various types of data such as a list of shelters in an area under jurisdiction of a local government, position information of the shelters, and account information of a user who subscribes to the disaster evacuee support service described above. Note that description of each data of the setting information 13A and the map information 13B will be described later together with description of processing in which reference or generation is performed.

The control unit 15 is a processing unit that performs overall control of the server device 10. For example, the control unit 15 is implemented by a hardware processor. As illustrated in FIG. 1, the control unit 15 includes an acquisition unit 15A, a calculation unit 15B, a determination unit 15C, a selection unit 15D, and a display control unit 15E.

The acquisition unit 15A is a processing unit that acquires an image. As an example only, the acquisition unit 15A may acquire an image output from the camera 20 for each camera 20 in frame units. Here, an information source from which the acquisition unit 15A acquires the image may be an optional information source, and is not limited to the camera 20. For example, the acquisition unit 15A may acquire the image from storage for accumulating images or a removable medium such as a memory card or a universal serial bus (USB) memory. In addition, the acquisition unit 15A may also acquire the image from an external device other than the camera 20 via the network NW.

The calculation unit 15B is a processing unit that calculates a value related to congestion, for example, the congestion evaluation value described above. As an example only, the calculation unit 15B executes the following processing for each facility, for example, shelter 2. Hereinafter, as an example only of a use scene, a case where the shelter 2 has one entrance will be given as an example. According to this example, an image is acquired from one camera 20 for each shelter. In this case, for each image acquired by the acquisition unit 15A, the calculation unit 15B applies the image analysis technology illustrated in FIG. 2 to the image. For example, the image analysis technology may be implemented by a machine learning model that outputs a counted number of people in a shelter by inputting a still image of the shelter or a moving image of the shelter of a specific number of frames retroactively from the latest frame. To generate such a machine learning model, as an example, a deep learning (DL) framework corresponding to a convolutional neural network (CNN) may be used. Note that, in a case where there is a plurality of entrances in one shelter 2, it is sufficient that the number of people in one shelter is counted by using each of images acquired from the number of cameras 20 corresponding to the number of entrances as an input.

After counting the number of people in the shelter, the calculation unit 15B calculates the congestion evaluation value of the shelter on the basis of the number of evacuees in the shelter and the upper limit number of people set in the shelter. Examples of such a congestion evaluation value include a degree of congestion and the number of vacancies. For example, the "degree of congestion" may be calculated by dividing the number of evacuees by the upper limit number of people, which is "the number of evacuees÷ the upper limit number of people". Here, as an example only, an example is given in which the greater a value of the degree of congestion, the higher the calculated degree of congestion of the shelter. However, the smaller the value of the degree of congestion, the higher the calculated degree of congestion of the shelter may become. Furthermore, "the number of vacancies" may be calculated by subtracting the number of evacuees from the upper limit number of people, which is "the upper limit number of people−the number of evacuees".

The determination unit 15C determines a priority among a plurality of shelters according to the congestion evaluation value of each of the plurality of shelters. As an example only, the determination unit 15C sorts the shelters 2 in descending order of the degree of congestion. As a result, the shelters 2 are rearranged in the order of high degree of congestion, which is so-called descending order. Then, the determination unit 15C determines whether or not there are shelters 2 having equivalent degrees of congestion. The term "equivalent" as used herein refers to both a state where the values are the same and a state where a difference in the degree of congestion between the shelters is within a threshold. At this time, in a case where there are the shelters 2 having the equivalent degrees of congestion, the determination unit 15C narrows down the shelters sorted in the descending order of the degree of congestion to the shelters having the equivalent degrees of congestion, and further sorts in the order of the small number of vacancies, which is so-called ascending order. An arrangement order, for example, the order of the shelters 2 obtained as a result of such sorting is determined as the priority.

The selection unit 15D selects a specific number of shelters among a plurality of shelters on the basis of the priority among the shelters. As an example only, the selection unit 15D selects, among the shelters 2, a specific number of shelters with a higher priority, for example, the top one shelter or the top four shelters. For example, for the number of shelters selected by the selection unit 15D, the number of selected shelters set in the setting information 13A stored in the storage unit 13 is referred to, as an example only. Here, the number of shelters selected by the selection unit 15D may not be limited only to the selected number set in the setting information 13A. For example, the selection unit 15D may reselect a shelter that satisfies a condition 1 in which the degree of congestion is equal to or greater than a threshold among the shelters selected on the basis of the priority. Furthermore, the selection unit 15D may reselect a shelter that satisfies a condition 2 in which the number of vacancies is less than a threshold among the shelters selected on the basis of the priority. Moreover, the selection unit 15D may reselect a shelter that satisfies the conditions 1 and 2 among the shelters selected on the basis of the priority. Note that the number of selected shelters set in the setting information 13A may be system-defined or user-defined.

FIG. 12 is a schematic diagram illustrating an example of selection algorithm. As an example, FIG. 12 schematically illustrates an example of a calculation result by the calculation unit 15B as a table 1561. As illustrated in FIG. 12, in the table 1561, the number of evacuees, a seating capacity, the number of vacancies, and a degree of congestion are associated with each of the shelters 2A to 2G. Among these, the "seating capacity" may be defined in advance before the shelter is selected. The term "seating capacity" as used herein corresponds to an example of the upper limit number of people in a shelter, and may be set, for example, in terms of a capacity of the shelter by a design company or the like of a structure of the shelter. This is just one aspect, and it is also possible to set the upper limit number of people from another aspect. For example, from an aspect that temperature or humidity correlates with an infection risk, a corrected seating capacity in which the seating capacity is corrected on the basis of the temperature or humidity measured at the shelter may be set as the upper limit number of people.

For example, taking the shelter 2A as an example, the number of evacuees is calculated to be 800 by counting the number of evacuees in an image captured by the camera 20A. Then, the degree of congestion "0.8" is calculated by dividing the number of evacuees "800" by the seating capacity "1000". Moreover, the number of vacancies "200" is calculated by subtracting the number of evacuees "800" from the seating capacity "1000". Also for the shelters 2B to 2G other than the shelter 2A, although values of the seating capacity and the number of evacuees are different, similar calculation may be executed to calculate the congestion evaluation values such as the degree of congestion and the number of vacancies. As a result, the table 15B1 illustrated in FIG. 12 is generated.

Thereafter, by rearranging the shelters 2A to 2G in the table 15B1 in the order of high degree of congestion, which is so-called descending order, a table 15C11 in which the shelters 2A to 2G are sorted in descending order of congestion may be obtained. Then, it is determined whether or not there are shelters 2 having equivalent degrees of congestion among the shelters 2A to 2G. In the example of the table 15C11, the degrees of congestion of the shelter 2A and the shelter 2E are the same value "0.8", and further, the degrees of congestion of the shelter 2C and the shelter 2G are the same value "0.5". Thus, it is difficult to determine superiority or inferiority by one index of the degree of congestion because evaluations of the shelter 2A and the shelter 2E are the same, and evaluations of the shelter 2C and the shelter 2G are the same. Therefore, among the shelters 2A to 2G in the table 15C11, the shelter 2A and the shelter 2E, which have the same value of the degree of congestion, are further rearranged in ascending order of the number of vacancies, and the shelter 2C and the shelter 2G, which have the same value of the degree of congestion, are further rearranged in ascending order of the number of vacancies. As a result, a table 15C12 is obtained. An arrangement order, for example, the order of the shelters 2 in the table 15C12 obtained in this way is determined as the priority. Here, a case where the number of selected shelters set in the setting information 13A is "4" is given as an example. In this case, shelters 2 corresponding to shelters with the top four priorities are selected among the shelters 2A to 2G. For example, according to the example of the table 15C12 illustrated in FIG. 12, the shelter 2E, the shelter 2A, the shelter 2F, and the shelter 2G are selected.

In this way, by selecting a shelter on the basis of a priority corresponding to a result of sorting by a degree of congestion and the number of vacancies, it is possible to display alert information regarding the shelter where congestion is more severe. In the example of the table 15C12 illustrated in FIG. 12, the shelter 2C and the shelter 2G both have the degree of congestion "0.5" and are equivalently congested. However, in the case of selecting the top four shelters, one of the shelter 2C and the shelter 2G is excluded from the shelters to be alerted. Even in such a case, the shelter 2G with the number of vacancies smaller than that of the shelter 2C is selected on the basis of the table 15C12 further sorted by the number of vacancies. Therefore, while the shelter 2G in which congestion is more severe than the shelter 2C is included in the shelters to be alerted, the shelter 2C in which congestion is less severe than the shelter 2G may be excluded from the shelters to be alerted.

The display control unit 15E is a processing unit that executes various types of display control for the client terminal 30. As one aspect, in a case where the display control unit 15E accepts a display request of the dashboard screen from the client terminal 30, the display control unit 15E executes the following processing. For example, the display control unit 15E reads out map information corresponding to an account of a local government that is a subscriber to the disaster evacuee support service described above in the map information 13B stored in the storage unit 13. Subsequently, the display control unit 15E maps symbols corresponding to shelters managed in an area under jurisdiction of the local government to a map image included in the map information. For such mapping, functions provided by GIS software may be used, as an example. Then, the display control unit 15E generates display data of the dashboard screen including the map image in which the shelters are mapped according to a display pattern set in the setting information 13A, for example, one of the three display patterns illustrated in FIGS. 3 to 5. The dashboard screen generated in this way is displayed on the client terminal 30. Thereafter, in a case where the number of evacuees is calculated by the calculation unit 15B, the display control unit 15E updates display of annotation of the number of evacuees associated with the symbol of each shelter.

As another aspect, the display control unit 15E displays the alert information on the dashboard screen. As an example only, the display control unit 15E displays, on the dashboard screen, the alert information regarding the shelter selected by the selection unit 15D among the shelters managed by the local government. At this time, the display control unit 15E displays the alert information on the dashboard screen according to a display pattern set in the setting information 13A, for example, one of the display patterns illustrated in FIGS. 7 to 11. For example, the alert information may include a message and the like illustrated in FIGS. 7 to 11, the number of evacuees, and the congestion evaluation value.

Figure 13:
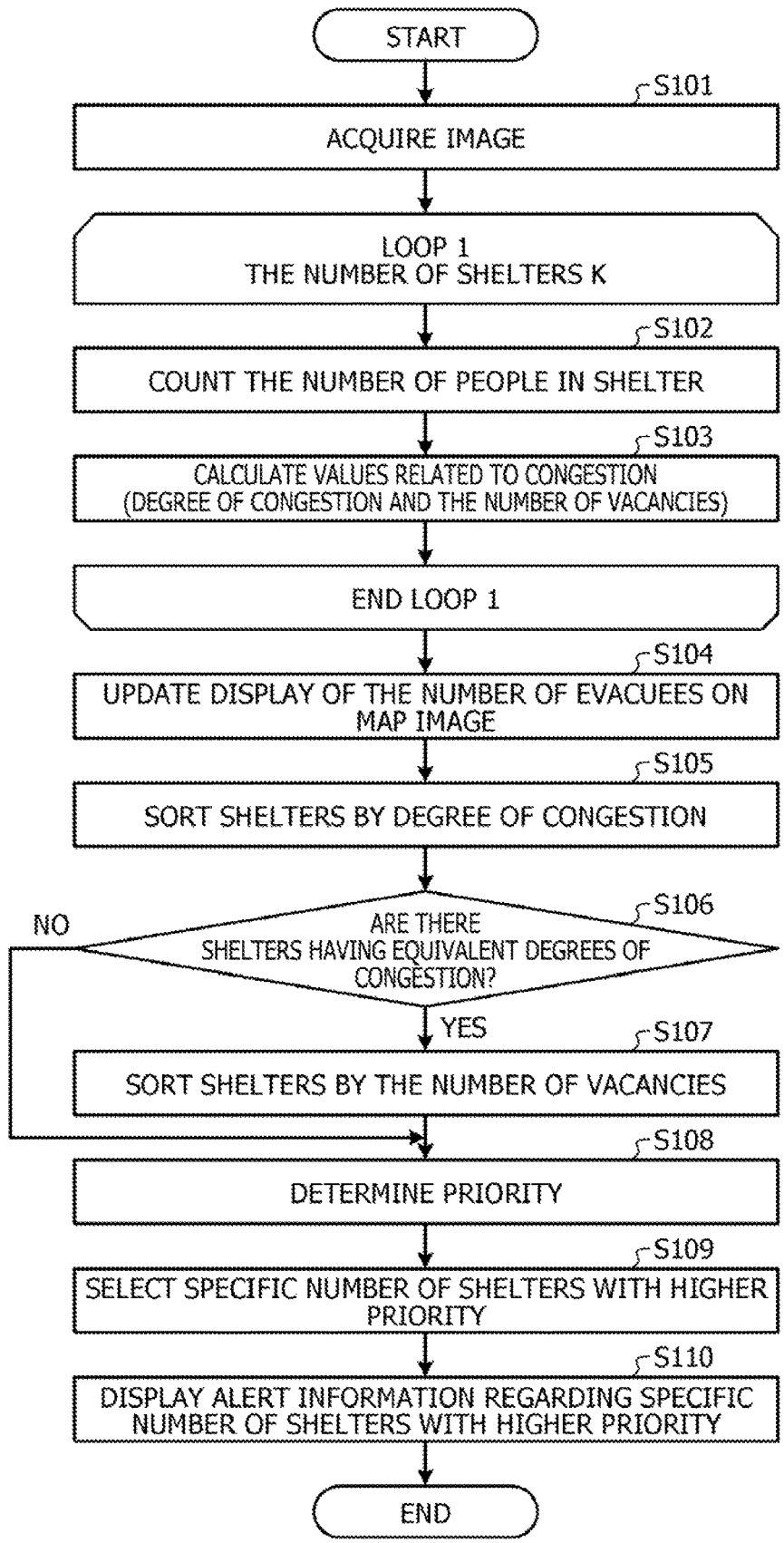
FIG. 13 is a flowchart illustrating a procedure of display control processing according to the first embodiment.

Next, a flow of processing of the server device 10 according to the present embodiment will be described. FIG. 13 is a flowchart illustrating a procedure of display control processing according to the first embodiment. For example, the display control processing is started in a case where the dashboard screen is displayed on the client terminal 30. Thereafter, the display control processing is repeated at a cycle in which an image is acquired by the camera 20, or at a specific interval, for example, every second. Then, the display control processing ends in a case where the dashboard screen is closed.

As illustrated in FIG. 13, the acquisition unit 15A acquires an image from the camera 20 installed in the shelter 2 for each of the shelters 2 associated with an account of a local government (Step S101).

Thereafter, loop processing 1 that repeats processing of the following Step S102 and the following Step S103 is started for the number of times corresponding to the total number N of the shelters 2. Note that, although an example in which the loop processing is performed is given here, the processing of the following Step S102 and the following Step S103 may be executed in parallel for each shelter 2.

For example, the calculation unit 15B counts the number of evacuees in the shelter by applying the image analysis technology illustrated in FIG. 2 to the image acquired in Step S101 (Step S102). Then, the calculation unit 15B calculates a degree of congestion and the number of vacancies in the shelter as congestion evaluation values on the basis of the number of evacuees in the shelter counted in Step S102 and the upper limit number of people set in the shelter (Step S103).

By repeating such loop processing 1, it is possible to obtain, for each shelter 2, the congestion evaluation values including the number of evacuees, the degree of congestion, and the number of vacancies. Then, when the loop processing 1 ends, the display control unit 15E updates display of an annotation of the number of evacuees associated with a symbol of each shelter on the basis of the number of evacuees calculated for each shelter in Step S102 (Step S104).

Then, the determination unit 15C sorts the shelters 2 in descending order of the degree of congestion (Step S105). Subsequently, the determination unit 15C determines whether or not there are shelters 2 having equivalent degrees of congestion (Step S106).

At this time, in a case where there are the shelters 2 having the equivalent degrees of congestion (Yes in Step S106), the determination unit 15C further sorts the shelters 2 having equivalent degrees of congestion in ascending order of the number of vacancies among the shelters 2 sorted in the descending order of the degree of congestion in Step S105 (Step S107). Note that, in a case where there are no shelters 2 having the equivalent degrees of congestion (No in Step S106), processing of Step S107 is skipped and the processing proceeds to processing of Step S108.

Thereafter, the determination unit 15C determines an arrangement order, for example, the order of the shelters 2 obtained as a result of sorting in Step S105 or S107 as a priority of each shelter (Step S108).

Then, the selection unit 15D refers to the number of selected shelters set in the setting information 13A, and selects, among the shelters 2, a specific number of shelters with the higher priority determined in Step S108, for example, the top one shelter 2 or the top four shelters 2 (Step S109).

Then, the display control unit 15E displays, on the dashboard screen, alert information regarding the shelters selected in Step S109 among the shelters managed by the local government according to a display pattern set in the setting information 13A (Step S110), and the processing ends.

As described above, the server device 10 according to the present embodiment displays alert information regarding a shelter selected according to a value related to congestion that is evaluated from the upper limit number of people for each of a plurality of shelters included in a specific area and the number of evacuees calculated from each image of the plurality of shelters. Therefore, according to the server device 10 according to the present embodiment, it is possible to prevent information regarding a facility for which countermeasures are needed from being buried.

Second Embodiment

While the embodiment related to the disclosed apparatus have been described above, the disclosed technology may be carried out in a variety of different modes in addition to the embodiment described above. Thus, hereinafter, another embodiment included in the disclosed technology will be described.

In the first embodiment described above, the degree of congestion and the number of vacancies are given as examples of the congestion evaluation value. However, a congestion evaluation value other than the degree of congestion and the number of vacancies may be used for the display control of the alert information. For example, the calculation unit 15B may calculate an amount of change in the degree of congestion and an amount of change in the number of evacuees as the congestion evaluation values. For example, the "amount of change in the degree of congestion" may be calculated according to the following Expression (1), and the "amount of change in the number of evacuees" may be calculated according to the following Expression (2). As an example only of a "time t" in the following Expressions (1) and (2), a time when the latest frame image is acquired from the camera 20 may be mentioned. Furthermore, as an example only of "Δt", 10 minutes, 30 minutes, or the like may be mentioned.

$$\text{Amount of change in the degree of congestion at the time } t = \{\text{Degree of congestion}(t) - \text{Degree of congestion}(t-\Delta t)\}/\Delta t \quad (1)$$

$$\text{Amount of change in the number of evacuees at the time } t = \{\text{The number of evacuees}(t) - \text{The number of evacuees}(t-\Delta t)\}/\Delta t \quad (2)$$

FIG. 14 is a schematic diagram illustrating an application example of the selection algorithm. As an example, FIG. 14 schematically illustrates an example of a calculation result by the calculation unit 15B as a table 15B2. As illustrated in FIG. 14, in the table 15B2, the number of evacuees, a seating capacity, the number of vacancies, a degree of congestion, an amount of change in the number of evacuees, and an amount of change in the degree of congestion are associated with each of the shelters 2A to 2G.

For example, taking the shelter 2A as an example, the number of evacuees is calculated to be 800 by counting the number of evacuees in an image captured by the camera 20A. Then, the degree of congestion "0.8" is calculated by dividing the number of evacuees "800" by the seating capacity "1000". Moreover, the number of vacancies "200" is calculated by subtracting the number of evacuees "800" from the seating capacity "1000". Up to this point is similar to the example illustrated in FIG. 12. Here, when Δt is set to "0.5 h" and the degree of congestion at time t−Δt is set to "0.75", the amount of change in the degree of congestion at the time t is obtained as "0.1" by calculation of {(0.8−0.75)/ 0.5}. Furthermore, when the number of evacuees at the time t−Δt is set to "750", the amount of change in the number of evacuees at the time t is obtained as "100" by calculation of {(800−750)/0.5}. Also for the shelters 2B to 2G other than the shelter 2A, although values of the seating capacity, the number of evacuees, and the degree of congestion are different, similar calculation may be executed to calculate the congestion evaluation values such as the amount of change in the degree of congestion and the amount of change in the number of evacuees. As a result, the table 15B2 illustrated in FIG. 14 is generated.

Thereafter, by rearranging the shelters 2A to 2G in the table 15B2 in the order of large amount of change in the degree of congestion, which is so-called descending order, a table 15C21 in which the shelters 2A to 2G are sorted in descending order of the amount of change in degree of congestion may be obtained. Then, it is determined whether or not there are shelters 2 having equivalent amounts of change in the degree of congestion among the shelters 2A to 2G. In the example of the table 15C21, the amounts of change in the degree of congestion of the shelter 2A and the shelter 2B is the same value "0.1", and further, the amounts of change in the degree of congestion of the shelter 2F and the shelter 2G are the same value "0.06". Thus, it is difficult to determine superiority or inferiority by one index of the amount of change in the degree of congestion because evaluations of the shelter 2A and the shelter 2B are the same, and evaluations of the shelter 2F and the shelter 2G are the same. Therefore, among the shelters 2A to 2G in the table 15C21, the shelter 2A and the shelter 2B, which have the same value of the amount of change in the degree of congestion, are further rearranged in descending order of the amount of change in the number of evacuees, and the shelter 2F and the shelter 2G, which have the same value of the amount of change in the degree of congestion, are further rearranged in descending order of the amount of change in the number of evacuees. As a result, a table 15C22 is obtained. An arrangement order of the shelters 2 in the table 15C22 obtained in this way, for example, the order is determined as the priority. Here, a case where the number of selected shelters set in the setting information 13A is "4" is given as an example. In this case, shelters 2 corresponding to shelters with the top four priorities are selected among the shelters 2A to 2G. For example, according to the example of the table 15C22 illustrated in FIG. 14, the shelter 2E, the shelter 2A, the shelter 2B, and the shelter 2G are selected.

In this way, by selecting a shelter on the basis of a priority corresponding to a result of sorting by the amount of change in the degree of congestion and the amount of change in the number of evacuees, it is possible to display alert information regarding the shelter where a rapid increase is more severe. In the example of the table 15C22 illustrated in FIG. 14, the shelter 2F and the shelter 2G both have the amount of change in the degree of congestion "0.06" and are equivalently congested. However, in the case of selecting the top four shelters, one of the shelter 2F and the shelter 2G is excluded from the shelters to be alerted. Even in such a case, the shelter 2G with the amount of change in the number of evacuees greater than that of the shelter 2F is selected on the basis of the table 15C22 further sorted by the amount of change in the number of evacuees. Therefore, while the shelter 2G in which the rapid increase is more severe than the shelter 2F is included in the shelters to be alerted, the shelter 2F in which the rapid increase is less severe than the shelter 2G may be excluded from the shelters to be alerted.

Furthermore, in the first embodiment described above, an example is given in which the degree of congestion is calculated on the basis of the number of evacuees and the seating capacity, but the degree of congestion may be calculated on the basis of the upper limit number of people based on the number of evacuees and a social distance, for example, 2 m. In this case, when the distance between people is set to 2 m, it is sufficient that an upper limit value of the number of people that may be accommodated may be set as the upper limit number of people.

Furthermore, in the first embodiment described above, an example is given in which the number of evacuees, the congestion evaluation value, and the like are displayed as the alert information, but another information may also be displayed as the alert information. As an example only, the nearest shelter positioned closest to the shelter to be alerted may be included in the alert information. As a result, it is possible to provide information that contributes to countermeasures to reduce an infection risk, such as dispersion of evacuees.

Figure 15:
FIG. 15 is a diagram illustrating an application example of the alert information.

FIG. 15 is a diagram illustrating an application example of the alert information. FIG. 15 illustrates an example in which the nearest shelters to the top two shelters 2E and shelter 2A are specified on the basis of the priorities of the shelters 2A to 2G as determined by the table 15C12, which is the result of sorting by the degree of congestion and the number of vacancies illustrated in FIG. 12. For such specification of the nearest shelters, position information of each of the shelters 2A to 2G is used, as an example only. For example, in the example of specifying the nearest shelter to the shelter 2E, distances are calculated between the shelter 2E and the shelters 2A to 2D, 2F, and 2G. Then, among the shelters 2A to 2D, 2F, and 2G, the shelter whose distance from the shelter 2E is within a threshold, which is the shelter 2B in the example of FIG. 15, is specified as the nearest shelter to the shelter 2E. Here, the nearest shelter does not necessarily need to be one. For example, in the example of specifying the nearest shelter to the shelter 2A, distances are calculated between the shelter 2A and the shelters 2B to 2G. Then, among the shelters 2B to 2G, the shelters whose distances from the shelter 2A are within a threshold, which are the shelter 2G and the shelter 2C in the example of FIG. 15, are specified as the nearest shelters to the shelter 2A. As a result, a table 15C31 is generated. The alert information is displayed on the dashboard screen on the basis of such a table 15C31. For example, the shelter 2B is displayed as the nearest shelter to the shelter 2E, and the shelter 2G and the shelter 2C are displayed as the nearest shelters to the shelter 2A.

In the first embodiment described above, a shelter is given as an example of a facility. However, since the dashboard function for facilities similar to shelters in general is also needed to take countermeasures against COVID-19, for example, countermeasures for avoiding three Cs, the display control function according to the first embodiment described above may be applied. For example, the display control function described above may be implemented by calculating a congestion evaluation value such as a degree of congestion or the number of vacancies from the number of visitors and the upper limit number of people in a facility such as a supermarket or a sports stadium.

Furthermore, components of the illustrated devices are not necessarily physically configured as illustrated in the drawings. For example, the specific aspects of distribution and integration of the respective devices are not limited to the illustrated aspects, and all or some of the devices may be functionally or physically distributed and integrated in an optional unit according to various loads, use situation, and the like. For example, the acquisition unit 15A, the calculation unit 15B, the determination unit 15C, the selection unit 15D, or the display control unit 15E may be connected as an external device of the server device 10 via a network. Furthermore, the acquisition unit 15A, the calculation unit 15B, the determination unit 15C, the selection unit 15D, and the display control unit 15E are included in different devices, and by connecting the devices to a network and making the devices to cooperate with each other, the functions of the server device 10 described above may be implemented.

[Display Control Program]

Furthermore, various types of processing described in the embodiments described above may be implemented by a computer such as a personal computer or a workstation executing a program prepared in advance. Thus, in the following, an example of a computer that executes a display control program having a function similar to the functions in the first and second embodiments will be described with reference to FIG. 16.

Figure 16:
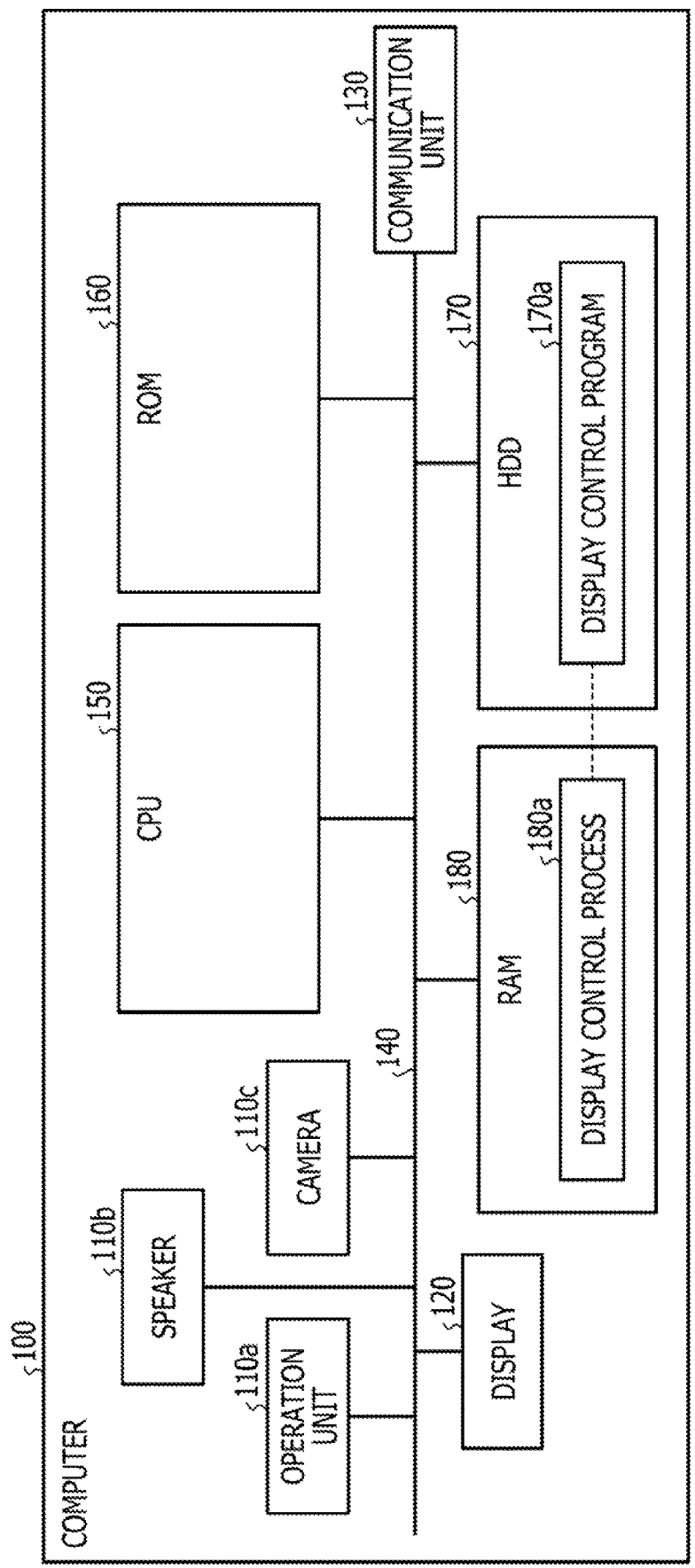
FIG. 16 is a diagram illustrating a hardware configuration example.

FIG. 16 is a diagram illustrating a hardware configuration example. As illustrated in FIG. 16, a computer 100 includes an operation unit 110a, a speaker 110b, a camera 110c, a display 120, and a communication unit 130. Moreover, the computer 100 includes a central processing unit (CPU) 150, a read-only memory (ROM) 160, a hard disk drive (HDD) 170, and a random-access memory (RAM) 180. These components 110 to 180 are each connected via a bus 140.

As illustrated in FIG. 16, the HDD 170 stores a display control program 170a that exhibits functions similar to functions of the acquisition unit 15A, the calculation unit 15B, the determination unit 15C, the selection unit 15D, and the display control unit 15E indicated in the first embodiment described above. The display control program 170a may be integrated or separated in a similar manner to each of the components of the acquisition unit 15A, the calculation unit 15B, the determination unit 15C, the selection unit 15D, and the display control unit 15E illustrated in FIG. 1. For example, all pieces of data indicated in the first embodiment described above does not necessarily need to be stored in the HDD 170, and only data for use in processing needs to be stored in the HDD 170.

Under such an environment, the CPU 150 reads out the display control program 170a from the HDD 170 and develops the display control program 170a on the RAM 180. As a result, the display control program 170a functions as a display control process 180a as illustrated in FIG. 16. The display control process 180a develops various types of data read out from the HDD 170 in an area allocated to the display control process 180a in a storage area of the RAM 180, and executes various types of processing by using the developed various types of data. For example, as an example of the processing executed by the display control process 180a, the processing illustrated in FIG. 13 is included. Note that, in the CPU 150, all the processing units indicated in the first embodiment described above do not necessarily need to operate, and only a processing unit corresponding to processing to be executed needs to be virtually implemented.

Note that the display control program 170a described above does not necessarily need to be stored in the HDD 170 or the ROM 160 from the beginning. For example, the display control program 170a is stored in a "portable physical medium" such as a flexible disk, which is a so-called FD, a compact disc (CD)-ROM, a digital versatile disk (DVD), a magneto-optical disk, or an integrated circuit (IC) card to be inserted in the computer 100. Then, the computer 100 may acquire and execute the display control program 170a from these portable physical media. Furthermore, the display control program 170a may be stored in another computer, a server device, or the like connected to the computer 100 via a public line, the Internet, a LAN, a wide area network (WAN), or the like, and the computer 100 may acquire the display control program 170a from these and execute the display control program 170a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a display control program for causing a computer to execute processing, the processing comprising:

determining priorities of a plurality of facilities positioned within a specific area according to a value related to congestion determined on the basis of the upper limit number of people in each of the plurality of facilities and the number of visitors calculated on the basis of an image captured in each of the plurality of facilities;

selecting a specific number of facilities from the plurality of facilities on the basis of the determined priorities; and displaying, for each of the specific number of selected facilities, a position on a map and alert information according to the value related to the congestion.

2. The non-transitory computer-readable recording medium storing the display control program according to claim 1, wherein the processing of determining includes processing of determining the priorities by an arrangement order of the plurality of facilities obtained by sorting by a degree of congestion obtained by dividing, for each of the plurality of facilities, the number of visitors to the facility by the upper limit number of people in the facility.

3. The non-transitory computer-readable recording medium storing the display control program according to claim 2, wherein the processing of determining includes processing of determining the priorities by an arrangement order of the plurality of facilities obtained by further sorting combinations of facilities in which the degree of congestion is the same value or a difference in the degree of congestion is within a threshold in the arrangement order of the plurality of facilities obtained by the sorting by the degree of congestion by the number of vacancies obtained by subtracting, for each of the facilities included in the combinations, the number of visitors to the facility from the upper limit number of people in the facility.

4. The non-transitory computer-readable recording medium storing the display control program according to claim 1, wherein the processing of determining includes processing of determining the priorities by an arrangement order of the plurality of facilities obtained by sorting by an amount of change in a degree of congestion obtained by dividing, for each of the plurality of facilities, the number of visitors to the facility by the upper limit number of people in the facility.

5. The non-transitory computer-readable recording medium storing the display control program according to claim 4, wherein the processing of determining includes processing of determining the priorities by an arrangement order of the plurality of facilities obtained by further sorting combinations of facilities in which the amount of change in the degree of congestion is the same value or a difference in the amount of change in the degree of congestion is within a threshold in the arrangement order of the plurality of facilities obtained by the sorting by the amount of change in the degree of congestion by an amount of change in the number of visitors for each of the facilities included in the combinations.

6. The non-transitory computer-readable recording medium storing the display control program according to claim 1, wherein the processing of selecting includes processing of selecting a specific number of facilities which have the higher priority among the plurality of facilities and in which a comparison result of the value related to congestion and a threshold satisfies a specific condition.

7. A computer-implemented method of a display control, the method comprising:

determining priorities of a plurality of facilities positioned within a specific area according to a value related to congestion determined on the basis of the upper limit number of people in each of the plurality of facilities and the number of visitors calculated on the basis of an image captured in each of the plurality of facilities;

selecting a specific number of facilities from the plurality of facilities on the basis of the determined priorities; and displaying, for each of the specific number of selected facilities, a position on a map and alert information according to the value related to the congestion.

8. A display control apparatus comprising:

a memory; and a processor coupled to the memory, the processor being configured to perform processing, the processing including:

determining priorities of a plurality of facilities positioned within a specific area according to a value related to congestion determined on the basis of the upper limit number of people in each of the plurality of facilities and the number of visitors calculated on the basis of an image captured in each of the plurality of facilities;

selecting a specific number of facilities from the plurality of facilities on the basis of the determined priorities; and displaying, for each of the specific number of selected facilities, a position on a map and alert information according to the value related to the congestion.

* * * * *